July 1, 1924.

H. MITTEL

FLOAT VALVE

Original Filed Feb. 9, 1923

1,499,837

Inventor
Henry Mittel,
By Bernard F. Garvey
Attorney

Patented July 1, 1924.

1,499,837

UNITED STATES PATENT OFFICE.

HENRY MITTEL, OF SONORA, TEXAS.

FLOAT VALVE.

Application filed February 9, 1923, Serial No. 618,004. Renewed May 21, 1924.

*To all whom it may concern:*

Be it known that I, HENRY MITTEL, a citizen of the United States, residing at Sonora, in the county of Sutton and State of Texas, have invented certain new and useful Improvements in Float Valves, of which the following is a specification.

The present invention relates to float valves for liquid troughs, tanks or other receptacles.

Objects of the invention are to provide a float valve carried by the supply pipe of a receptacle and operable by the rise and fall of liquid immaterial of whether the supply pipe enters the liquid receptacle from the top, bottom, ends or sides; to provide a float valve positively operable by the rise and fall of the liquid, suitable means being provided to automatically cut off the supply if the float is displaced or incapacitated; and to provide a float valve of durable construction which is incumbersome, inexpensive and capable of expeditious installation.

Coordinate objects of the invention will be apparent from the following description of the present preferred form of the invention taken in connection with the accompanying drawings wherein:—

Figure 1:
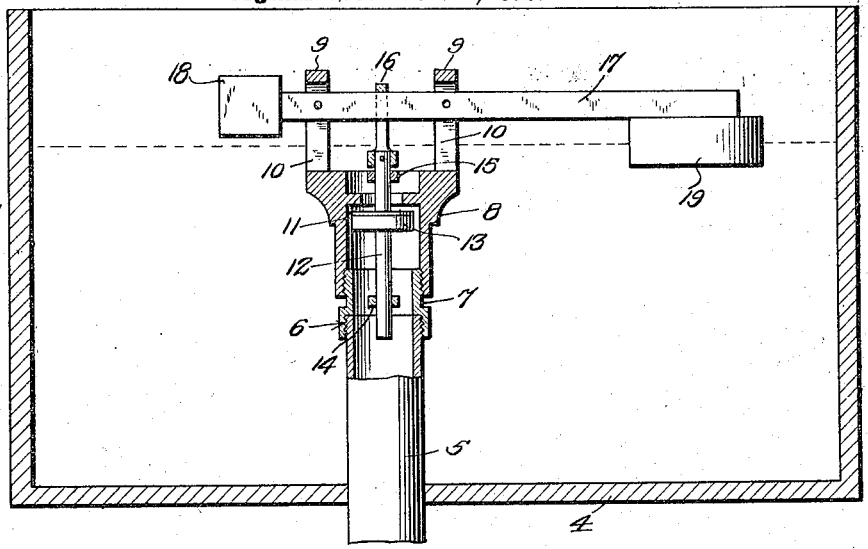
Fig. 1 is a vertical sectional view of a valve constructed in accordance with this invention illustrating its application in a receptacle into which the liquid supply pipe enters from the bottom.
Figure 2:
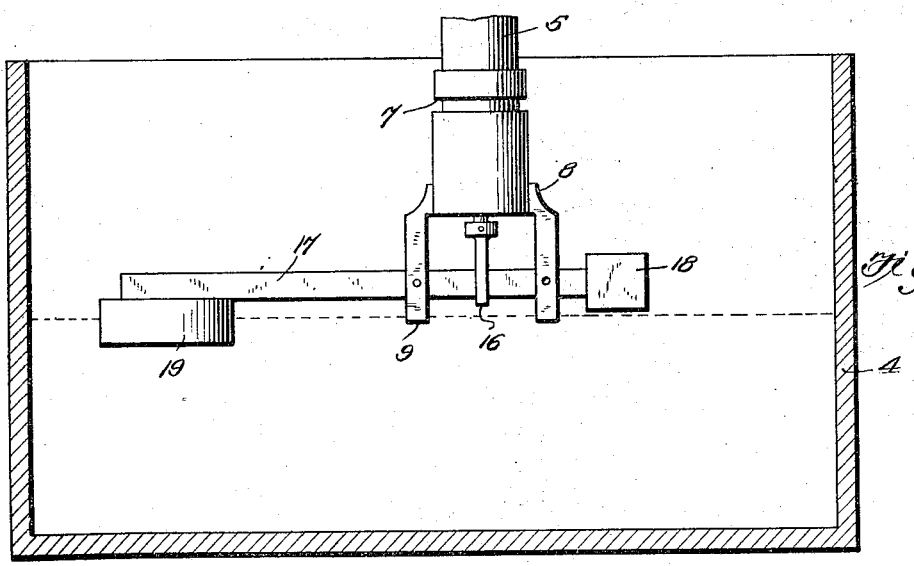
Fig. 2 is an elevational view of the valve illustrating its application in a receptacle, the latter receiving its liquid supply from a pipe leading through the top thereof.

In order to illustrate the application of this invention a liquid receptacle 4 is shown to which the liquid is supplied through a pipe 5 leading through the bottom of the receptacle in Fig. 1 and through the top of the receptacle in Fig. 2. The supply pipes may of course lead to any desired source of supply and are of standard construction. It is preferred that the outlet ends thereof be provided with screwthreads 6.

Figure 3:
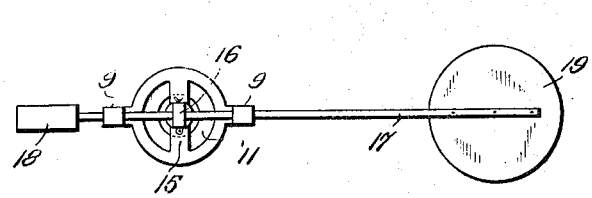
Fig. 3 is a plan view of a valve constructed in accordance with this invention as used in Fig. 1.

A collar 7 is provided which is adapted for engagement with the outlet end of the supply pipe 5 and consists of a cylindrical body the supply pipe engaging end of which is expanded outwardly and provided with internal screwthreads which engage the screwthreads of the supply pipe. The opposite end of the collar is provided with external screwthreads which are engaged with corresponding internal screwthreads formed on one end of a valve housing generally designated 8. The housing 8 comprises an integral metal body of cylindrical configuration which has parallelly arranged loops 9 issuing therefrom and projecting beyond the terminal of the cylindrical housing opposite to the end which is provided with the internal screwthreads. These loops, as shown to advantage in Fig. 3 are relatively narrow and are provided with elongated narrow openings 10. The housing has an annular valve seat 11 formed on its inner periphery adjacent the end of the housing which carries the loops 9.

A valve stem 12 is movably mounted in the housing 8 and carries a valve 13 which is located approximately midway the ends of the stem. One end of the stem is slidably arranged through a guide bar 14 formed on the inner periphery of the collar 7 while the opposite end extends through and beyond the valve seat 11 and through a guide bar 15 formed on the inner periphery of the housing 8 at the end upon which the loops 9 are formed. The outer end of the valve stem is detachably engaged by a yoke 16 so as to position the yoke midway between the loops 19 and thereby position the opening of the yoke in alignment with the openings 10 of said loops 9.

The valve actuating mechanism in the present instance consists of an elongated flat metal bar 17 which is pivotally mounted in one of the loops 9 and passes through the openings 10 of the loop as well as through the yoke 16. A weight 18 is mounted on one end of the bar while the opposite end of the latter is equipped with a float 19. If the liquid enters the receptacle from the bottom of the latter, as shown in Fig. 1, the arm 17 is pivoted to the loop which lies closest to the weight 18. Conversely, if the liquid supply pipe enters the receptacle from the top of the latter, the bar is pivoted in the loop member furthest away from the weight.

In use of this invention, assuming that the liquid enters the tank through a pipe rising upwardly through the bottom of the latter, the liquid is permitted to pass through the collar 7 and housing 8 into the receptacle until the liquid reaches a predetermined level as indicated in the drawings. When this level has been reached the float 19 is impinged causing the bar 17 to be moved on its axis against the resistance of the weight 18 thereby elevating the yoke 16 which correspondingly raises the valve 13 and closes the same on the seat 11. Even if the liquid enters the receptacle through a supply pipe depending through the top of the latter the operation of the valve and valve operating mechanism is the same, since the only difference is the change in the pivot pin. If the float 19 should be disconnected from the bar 17 the weight 18 automatically gravitates downwardly so as to close the valve on the seat and thereby positively prevent overflow of the receptacle.

From the above it is apparent that the construction of valve herein shown and described may be reversed by merely changing the pivot pin of the bar 17 requiring the expenditure of a negligible amount of time. This adapts the valve for use with practically all types of liquid receptacles. Moreover the construction of this invention eliminates possibility of the tank overflowing without in any way retarding normal operation of the valve so long as the valve operating mechanism is properly functioning. It is of course to be understood that various changes may be made in this device especially in the details of construction, proportion and arrangement of parts within the scope of the appended claims.

What is claimed is:—

1. A float valve for liquid receptacles, in combination with a receptacle and liquid supply pipe discharging into the latter, valve means associated with said pipe to close communication through the latter, and mechanism operable by the rise and fall of liquid in the receptacle to control operation of said means, said mechanism being reversible to adapt the same for use on a supply pipe entering the receptacle from either the top or bottom of the latter.

2. A reversible float valve including a housing equipped with a valve, a float carrying bar mounted in said housing and connected with the valve to operate the latter from above or below the housing said bar being pivoted to the housing in proximity to the float, when the bar is carried above the housing, and means to pivotally mount the bar on the housing, at a point remote from said float when the bar is mounted to operate below the housing.

HENRY MITTEL.